US011270215B2

(12) United States Patent
Reyes et al.

(10) Patent No.: US 11,270,215 B2
(45) Date of Patent: Mar. 8, 2022

(54) INTELLIGENT RECOMMENDATIONS

(71) Applicant: MicroStrategy Incorporated, Vienna, VA (US)

(72) Inventors: Benjamin Reyes, Great Falls, VA (US); Timothy Lang, Vienna, VA (US)

(73) Assignee: MicroStrategy Incorporated, Vienna, VA (US)

(*) Notice: Subject to any disclaimer, the term of this patent is extended or adjusted under 35 U.S.C. 154(b) by 997 days.

(21) Appl. No.: 15/899,579

(22) Filed: Feb. 20, 2018

(65) Prior Publication Data
US 2019/0258949 A1    Aug. 22, 2019

(51) Int. Cl.
*G06N 5/04* (2006.01)
*G06Q 10/06* (2012.01)
*H04L 67/50* (2022.01)
*G06Q 10/10* (2012.01)
*G06F 16/332* (2019.01)
(Continued)

(52) U.S. Cl.
CPC ....... *G06N 5/046* (2013.01); *G06F 16/24575* (2019.01); *G06F 16/3328* (2019.01); *G06Q 10/06315* (2013.01); *G06Q 10/107* (2013.01); *H04L 67/22* (2013.01); *G06N 20/00* (2019.01)

(58) Field of Classification Search
CPC .............. G06F 16/24578; G06F 16/93; G06F 16/9535; G06F 16/335; G06F 16/38; G06F 16/48; G06F 16/583; G06F 16/783; G06F 16/90324; H04L 67/1044; H04L 67/22;
(Continued)

(56) References Cited

U.S. PATENT DOCUMENTS 8,286,085 B1* 10/2012 Denise ................. G06Q 10/107
715/752
8,949,899 B2* 2/2015 Errico ................ H04N 21/4667
725/46
(Continued)

FOREIGN PATENT DOCUMENTS

CN        106407420 A  *  2/2017
WO     WO 2015/051450       4/2015
(Continued)

OTHER PUBLICATIONS

PCT Notification of Transmittal of the International Search Report and Written Opinion in International Application No. PCT/U S2018/018683, dated Sep. 14, 2018, 14 pages.

*Primary Examiner* — Shean Tokuta
(74) *Attorney, Agent, or Firm* — Fish & Richardson P.C.

(57) ABSTRACT

A recommendation engine may generate a recommendation in response to user interactions and executed operations in a system. The recommendation may be determined according to a number of factors including, but not limited to, an object affinity and a user affinity. The recommendation may include one or more of a recommendation to use an object and a recommendation for taking one or more actions. The recommendation may be provided to a user if the recommendation satisfies a confidence threshold. Recommendations provided by the recommendation engine are tracked to determine if the user accepted or rejected the recommendations. User history of accepting or rejecting recommendations may be utilized to train the recommendation engine for future recommendations and to build a user profile in a user database.

20 Claims, 7 Drawing Sheets

(51) Int. Cl.
*G06F 16/2457* (2019.01)
*G06N 20/00* (2019.01)

(58) Field of Classification Search
CPC ............ H04N 21/252; H04N 21/4661; H04N 21/4668
See application file for complete search history.

(56) References Cited

U.S. PATENT DOCUMENTS

| | | | |
|---|---|---|---|
| 9,699,129 B1* | 7/2017 | Nelken | H04L 51/22 |
| 9,740,783 B2 | 8/2017 | Yankovich et al. | |
| 9,753,922 B2* | 9/2017 | Hausler | H04L 67/1044 |
| 9,760,399 B1* | 9/2017 | Fraser | G06F 9/485 |
| 10,133,791 B1* | 11/2018 | Chan | G06F 16/2465 |
| 2008/0104052 A1 | 5/2008 | Ryan et al. | |
| 2008/0139112 A1 | 6/2008 | Sampath et al. | |
| 2009/0112832 A1 | 4/2009 | Kandogan et al. | |
| 2013/0151547 A1* | 6/2013 | Queck | G06F 16/9535 707/767 |
| 2014/0026113 A1* | 1/2014 | Farooqi | G06F 8/34 717/107 |
| 2014/0172779 A1* | 6/2014 | Tanushree | G06Q 10/0633 707/603 |
| 2014/0280877 A1* | 9/2014 | Koulomzin | H04L 67/02 709/224 |
| 2015/0180966 A1* | 6/2015 | Villaron | G06F 3/0483 715/753 |
| 2015/0324339 A1* | 11/2015 | Gubin | G06F 40/295 707/722 |
| 2016/0294961 A1* | 10/2016 | Cordes | G06Q 30/0631 |
| 2016/0344828 A1* | 11/2016 | Hausler | G06F 16/93 |
| 2017/0220535 A1* | 8/2017 | Olsen | G06F 40/166 |
| 2018/0025084 A1* | 1/2018 | Conlan | G06F 16/955 707/734 |
| 2018/0129908 A1* | 5/2018 | Gopalan | G06F 16/434 |
| 2018/0189856 A1* | 7/2018 | Lenhart | G06F 16/9535 |
| 2018/0233057 A1* | 8/2018 | Sitton | G09B 5/06 |
| 2018/0300324 A1* | 10/2018 | Ziraknejad | G06N 20/00 |
| 2018/0336415 A1* | 11/2018 | Anorga | G06F 16/50 |
| 2018/0365325 A1* | 12/2018 | Gireesha | G06F 16/38 |
| 2019/0258949 A1* | 8/2019 | Reyes | G06Q 30/0631 |
| 2021/0117714 A1* | 4/2021 | Yang | G06K 9/00483 |

FOREIGN PATENT DOCUMENTS

| | | | | |
|---|---|---|---|---|
| WO | WO-2017181106 A1 * | 10/2017 | ......... | G06F 16/3338 |
| WO | WO-2018183017 A1 * | 10/2018 | ........... | G06F 3/0482 |
| WO | WO-2019164470 A1 * | 8/2019 | ........... | G06Q 10/101 |

* cited by examiner

INTELLIGENT RECOMMENDATIONS

FIELD

This disclosure generally relates to computing techniques that generate recommendations and enhance user interfaces.

BACKGROUND

Content in documents and reports can generally be provided by content curators or content administrators. However, generating content to include in documents can be time and resource intensive, and, in some cases, inefficient. For example, in an enterprise environment, several members of the enterprise environment may be generating similar documents with similar content without being aware of each other's content or redundant efforts. In some cases, enterprise members may not be aware of an efficient manner of executing a set of operations. Accordingly, an improved and more efficient manner of working with documents and executing operations is needed.

SUMMARY

This disclosure generally describes a system and method for providing recommendations that improve the efficiency of interactions with a computing system. A computing system can identify patterns in the actions of a user and characteristics of the content a user manipulates. From analysis of existing documents or patterns of other users, the computing system can recommend documents or actions that may achieve the user's intended result with reduced time and computation. For example, as user manually adds components to a new document, the computing system can identify a completed document of another user that was generated using similar components or steps. When certain criteria are satisfied, the computing system can notify the user of the existing document, or recommend that certain features of the existing document be imported into the new document, to greatly speed up the user's task. In some implementations, the computing system can do this automatically, without the user formulating a query or requesting a document. In many instances, timely and relevant recommended documents can avoid the need for new documents to be created, so that the computing system does not need to provide or process input from as many user interfaces for manually creating new documents.

The computing system may provide recommendations at various times, including in the middle of a workflow as a user is creating a new document. By identifying an existing document that suits the user's needs, as inferred from the recent sequence of user actions, the computing system improves avoids the need to generate a duplicate or redundant document, thus saving computing resources and storage space. In this instance, the computing system can also provide an appropriate document to the user much more quickly that would be required if the user newly created the document. Recommendations can be provided at other times and other interfaces, such as from a main page or home screen, while a user is reading a document, in response to a search query, and so on. In general, the recommendations can improve and shorten a user's workflow, and can be triggered when a user causes an operation to be executed or the user interacts with an object.

In some implementations, a recommendation engine may generate a recommendation in response to one or more of user interactions and executed operations. The recommendation may be determined according to a number of factors including, but not limited to, an object affinity and a user affinity. The recommendation may include one or more of a recommendation to use an object and a recommendation for taking one or more actions, which may include recommendations for executing one or more operations. The recommendation may be provided to a user if the recommendation satisfies a confidence threshold.

In some implementations, the recommendation engine may help foster increased collaboration and improve efficiency in an enterprise environment. For example, in some cases, the recommendation engine may suggest an improved manner of executing a particular task a user is working on based on telemetric data gathered from users who have previously executed the task with greater efficiency. In some cases, the recommendation engine may provide a user who is editing a document with a recommendation to include content that may be relevant for the document. The recommended content may have been generated by another user in the enterprise environment. In some cases, the recommendation engine may suggest implementing particular filters or settings that will likely increase user productivity or work efficiency.

Implementations described in this specification provide several advantages. For example, a computing system can reduce or eliminate redundant efforts by different users or enterprise members by providing recommendations for computing operations and documents. The computing system can identify and recommend previously generated documents and other content that is relevant to documents or content in the process of being generated. This can enable the computing system to provide needed data and documents much faster than typical document generation interfaces, and without requiring query entry or processing. Individual users may work more efficiently by incorporating work previously completed by another enterprise member thereby reducing the amount of time a user may spend completing a task and consuming computing resources for the task. In some cases, the recommendation engine may provide suggestions such as methods to execute a task faster, instructions, help or guidance for completing a task, or a contact person associated with a task. These suggestions help a user complete tasks with greater convenience and efficiency.

In some implementations, recommendations provided by the recommendation engine are tracked to determine if the user accepted or rejected the recommendations. User history of accepting or rejecting recommendations may be utilized to train the recommendation engine for future recommendations and to build a user profile in a user database.

Innovative aspects of the subject matter described in this specification include, in some implementations, a computer-implemented method to perform operations. The operations include determining, by one or more computing devices, an interaction of a user with an object in a computing environment that includes a network and determining, by the one or more computing devices, (i) an object affinity of the object with one or more other objects in the computing environement, (ii) a user affinity of the user with one or more other users having devices connected to the network, or (iii) both the object affinity and the user affinity. The one or more computing devices generate a recommendation for a subsequent interaction of the user with the object based on (i) the object affinity, (ii) the user affinity, or (iii) both the object affinity and the user affinity. The recommendation includes a suggestion to include, in the object being interacted with by the user, content included in at least one of the one or more other objects in the computing environment. The one or more computing devices determine that a confidence level associated with the recommendation satisfies a confidence threshold. In response to the confidence level associated with the recommendation satisfying the confidence threshold, the recommendation is transmitted to a user device associated with the user.

Implementations may each optionally include one or more of the following features. For instance, in some implementations, determining, by the one or more computing devices, that the confidence level associated with the recommendation satisfies the confidence threshold includes determining a quality level of an object being recommended in the recommendation, and determining that the quality level satisfies a quality threshold.

In some implementations, the operations further include storing data indicative of an acceptance or a rejection of a previous recommendation transmitted to the user device. The previous recommendation is transmitted prior to the recommendation for the subsequent operation being generated. The operation of determining, by the one or more computing devices, that the confidence level associated with the recommendation satisfies the confidence threshold includes determining the confidence level based on the data indicative of an acceptance or a rejection of the previous recommendation transmitted to the user device.

In some implementations, the operations further include storing a history of interactions associated with the user. The operation of determining, by the one or more computing devices, that the confidence level associated with the recommendation satisfies the confidence threshold includes determining the confidence level based on the history of interactions associated with the user.

In some implementations, the object is selected from the group consisting of an application, file, folder, report, document, dossier, image, textual string, and an element within an application, file, folder, report, document, or dossier.

In some implementations, determining the object affinity of the object with the one or more other objects includes determining a level of similarity between the object and the one or more other objects based on a similarity between an attribute of the object and an attribute of the one or more other objects accessible over the network.

In some implementations, the attribute of the object is selected from the group consisting of an object type, a date and time of creation, an object purpose, metadata associated with the object, content associated with the object, subject matter associated with the object, and any combination of the object type, the date and time of creation, the object purpose, the metadata, the content, and the subject matter.

In some implementations, determining the user affinity of the user with the one or more other users having devices connected to the network includes determining a level of similarity between the user and the one or more other users having devices connected to the network based on a similarity between an attribute of the user and an attribute of the one or more other users having devices connected to the network. The attribute of the user is selected from the group consisting of a job title of the user, a job description of the user, a group of which the user is a member, an activity in which the user engaged in, and any combination of the job title, the job description, the group of which the user is a member, and the activity.

In some implementations, the recommendation is generated when the object is being created or when the object is being modified.

In some implementations, the one or more other objects and the one or more other users having devices connected to the network are identified using telemetric data that is indicative of interactions between the one or more computing devices and one or more other users having devices connected to the network.

In some implementations, the operations further include receiving, from the user device associated with the user, a response indicating whether the user accepted or rejected the recommendation, and storing, in a user profile located in a storage database, data indicating whether the user accepted or rejected the recommendation.

According to some implementations, a computer-implemented method to perform operations is described. The operations include detecting, by one or more computing devices, execution of a set of operations in a computing environment, and determining, by the one or more computing devices, an operation affinity of the set of operations with one or more sets of operations previously executed in the computing environment. The one or more computing devices generate a recommendation for a subsequent operation based on the operation affinity. The recommendation includes a suggestion to execute an operation previously executed in the one or more set of operations previously executed in the computing environment. The one or more computing devices determine that a confidence level associated with the generated recommendation satisfies a confidence threshold. In response to the confidence level associated with the generated recommendation satisfying the confidence threshold, the recommendation is transmitted to a user device executing the set of operations within the computing environment.

In some implementations, the operations further include determining, by the one or more computing devices, (i) an object affinity of an object in the set of operations of which execution is detected with one or more other objects, (ii) a user affinity of a user associated with the set of operations of which execution is detected with one or more other users having devices connected to a network, or (iii) both the object affinity and the user affinity, In some implementations, the recommendation for the subsequent operation is generated based on the operation affinity, the user affinity, the object affinity, or any combination of the operation affinity, the user affinity, the object affinity.

In some implementations, determining, by the one or more computing devices, the operation affinity of the set of operations with the one or more sets of operations previously executed includes determining a level of similarity between the set of operations of which execution is detected and the one or more sets of operations previously executed based on a similarity between an attribute of the set of operations of which execution is detected and an attribute of the one or more sets of operations previously executed.

In some implementations, the attribute of the set of operations of which execution is detected is selected from the group consisting of a sequence of operations, a number and type of operations, users and objects involved in the set of operations, a purpose of executing the set of operations, and a location associated with the set of operation.

In some implementations, the operations further include storing data indicative of an acceptance or a rejection of a previous recommendation transmitted to the user device. The previous recommendation is transmitted prior to the recommendation for the subsequent operation being generated. The operation of determining, by the one or more computing devices, that the confidence level associated with the recommendation satisfies the confidence threshold includes determining the confidence level based on the data indicative of an acceptance or a rejection of the previous recommendation transmitted to the user device.

In some implementations, the operations further include storing a history of interactions performed by a user associated with the user device. The operation of determining, by the one or more computing devices, that the confidence level associated with the recommendation satisfies the confidence threshold includes determining the confidence level based on the history of interactions performed by the user associated with the user device.

In some implementations, the one or more sets of operations previously executed are identified using telemetric data that is indicative of interactions between the one or more computing devices and users having devices connected to the network.

In some implementations, the operations further include receiving, from the user device, a response indicating whether a user associated with the user device has accepted or rejected the recommendation, and storing, in a user profile located in a storage database, data indicating whether the user associated with the user device executing the set of operations has accepted or rejected the recommendation.

In some implementations, the operations further include storing one or more rules for generating a recommendation. The recommendation for a subsequent operation is generated in response to a trigger event that satisfies the one or more rules for generating a recommendation.

Other implementations of these aspects include corresponding systems, apparatus, computer-readable storage mediums, and computer programs configured to implement the actions of the above-noted methods.

The above-noted aspects and implementations further described in this specification may provide several advantages and improvements to the functionality and operation of recommendation systems. The intelligent recommendation system provides real-time monitoring and recommendations for objects and data, and limits the amount of redundant data included in user-generated objects and files. By dynamically alerting users to existing data objects that are relevant to a user's current user interface and actions, the system can reduce redundancies within the computing environment and improve network resource consumption and bandwidth. The system can provide simple click-and-approve interface to incorporate additional data into a user's work item, enabling significant document creation tasks to be initiated using minimal amounts of user interface area.

Additionally, the system may automatically and adaptively learn the needs of users in a specific enterprise and tailor recommendations for the procedures and data sets of that enterprise. For example, the system can index metadata and store data indicative of user preferences, user settings, a history of user interactions with the system, user responsibilities, and group memberships of the user in a user profile. The user profile data and indexed metadata is used to train recommendation engine, which can result in the generation of recommendations that have a greater degree of relevance to a user and are more likely to be accepted by a user. The recommendations generated by the intelligent recommendation system can be provided without a query input or query analysis process. Search terms are not needed to identity relevant data for a user, even to tailor recommendations to the specific task or user interface that the user is currently viewing. Enhanced logging and indexing of user actions, metadata, and user profile data can provide the basis for the system to identify relevant documents throughout a user's session of using a computer.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

This disclosure generally describes a system and method for fostering collaborative interaction and providing intelligent recommendations.

Figure 1:
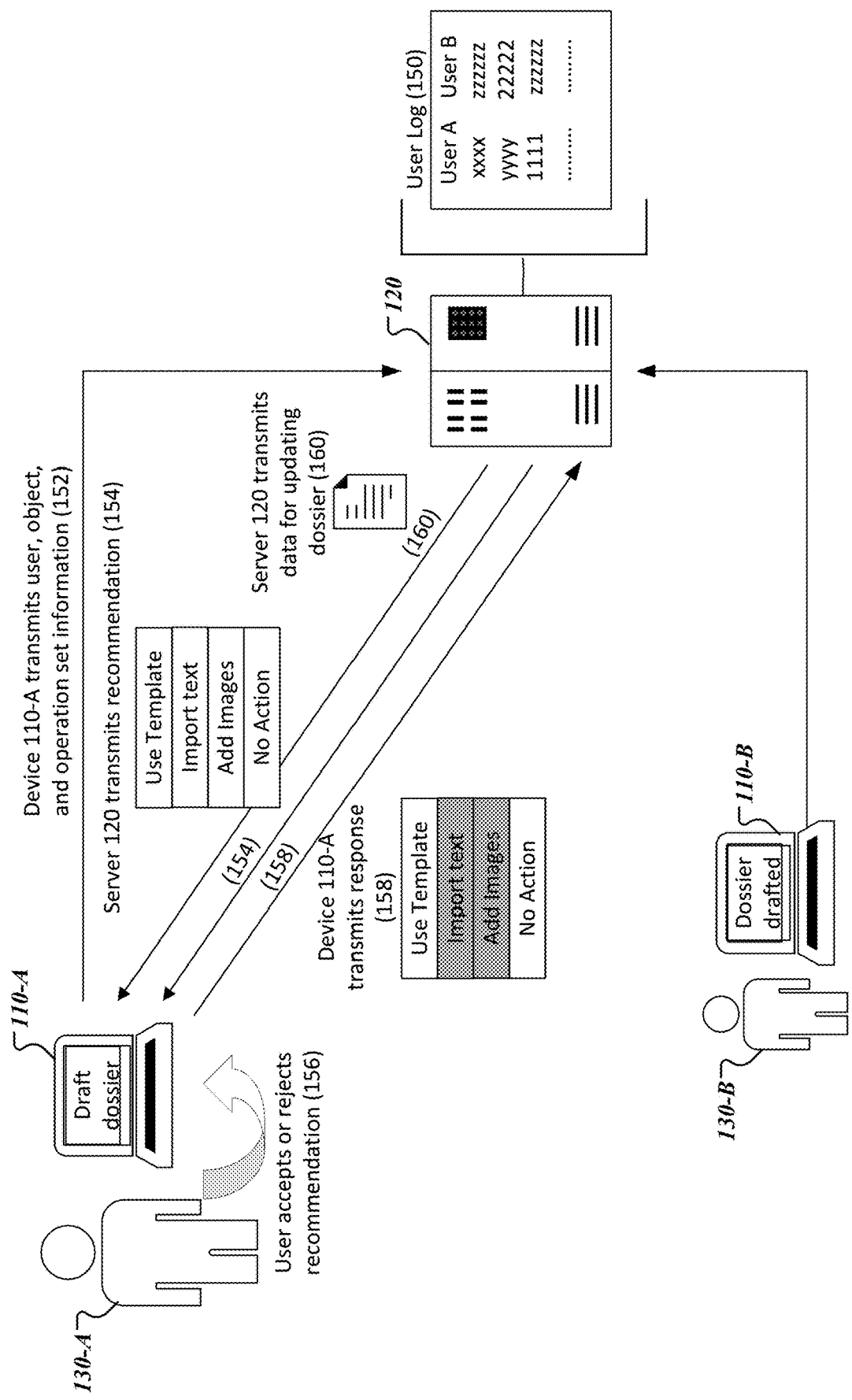
FIG. 1 depicts an example of a system for provisioning an intelligent recommendation.

FIG. 1 depicts an example of a system for provisioning an intelligent recommendation. In the system illustrated in FIG. 1, a network server 120 is connected to user devices 110-A and 110-B. User 130-A may be performing an operation, for example, preparing a document that includes a draft of a work plan, on user device 110-A. The document may include various types of data including, but not limited to, one or more of reports, spreadsheets, text documents, dashboards, web pages, graphs, charts, and visualizations. User 130-B may have previously completed a similar operation on user device 110-B or may be in the process of preparing the document but may have completed more portions of the document compared to User 130-A.

The network server 120 may store or be coupled to a storage device that stores telemetric data (150). Telemetric data may include a log with details related to interactions and operations performed in the system. For example, the log may keep a record of all interactions of any user connected to the system such as users 130-A and 130-B. These interactions may include, for example, logging into the system, preparing, viewing, saving a document, conducting an operation such as a conference call, or editing a document by, for example, adding charts, selecting data sources, adding visualizations, specifying statistical measures, or using certain metrics or equations.

When user 130-A is preparing the document, the network server 120 may request and receive user, object, and operation set information from user device 110-A. In some implementations, the user device 110-A may periodically send the user, object, and operation set information to network server 120 without receiving a request from the network server 120. In some implementations, the network server 120 may be able to determine user, object, and operation set information based on data (e.g., the user log) stored or accessible by network server 120, and may therefore not have to request the user device 110-A to send this information.

As described in more detail below, user information may include information that identifies one or more of: a user, an affiliation of the user, or devices associated with the user. Object information may include one or more of: a type of object, one or more files or applications associated with the object, users currently or previously interacting with the object, a date the object was created, one or more times the object was modified, and a purpose or function associated with the object. Operation set information may include a sequence of the operations in a set of operations executed by a user device connected to the system.

Based on one or more of the user, object, and operation set information, the network server 120 may generate and transmit a recommendation (154). In particular, as described in more detail below, the network server 120 determines whether one or more of the user, object, and operation set associated with user 130-A and device 110-A have an affinity or similarity with other users, objects, or operation sets.

In the scenario depicted in FIG. 1, the network server 120 may determine that user 130-B recently completed drafting a document on device 110-B that is similar to the document being prepared by user 130-A. The network server 120 may then generate one or more recommendations that user 130-A may be interested in. For example, as shown in FIG. 1, the network server 120 may generate recommendations for (i) "Use Template" in which user 130-A may use the same template user 130-B used for the document; (ii) "Import Text" in which user 130-A may use all or portions of the same text user 130-B used for the document; (iii) "Add Images" in which user 130-A may execute a set of operations to add images to the document as user 130-B did for the document; or (iv) "No Action" in which user 130-A dismisses the recommendations.

The recommendations may be received and displayed by device 110-A. User 130-A may accept or reject the recommendations through any suitable user interface at device 110-A. The user device 110-A may then transmit a response to the network server 130 with an indication of the selections made by user 130-A (158). As shown in FIG. 1, user 130-A selects the "Import Text" and "Add Images" options.

In response to receiving the user selection, network server 120 transmits data to user device 110-A for updating the document being drafted by user 130-A (160). To transmit this data, the network server 130 may determine the difference in the textual content between the document being drafted by user 130-A and the document already prepared by user 130-B. The network server 130 may also prepare a set of instructions that can guide the user on how to locate and add images that were added to the document by user 130-B based on the set of operations performed by user 130-B to add the images. The set of instructions and content data may be included as the data for updating the document being drafted by user 130-A. In some implementations, the instructions may guide a user on how to conduct one or more operations, such as adding images, and may also provide data about the content on which the operations is being performed on, for example, locations where the images can be obtained. In some implementations, the operations to determine the difference between the textual content or to determine the set of operations may be performed at the time the recommendations are generated in operation 154.

When the user device 130-A receives the data for updating the document, the user device 130-A may then insert the text into the document and request authorization from user 130-A to execute the received instructions for locating and adding images to the document. Accordingly, the intelligent recommendation system and method depicted in FIG. 1 enables users to complete tasks with improved efficiency and increased collaboration. Additional details and examples of intelligent recommendation methods and systems are described below.

Figure 2A:
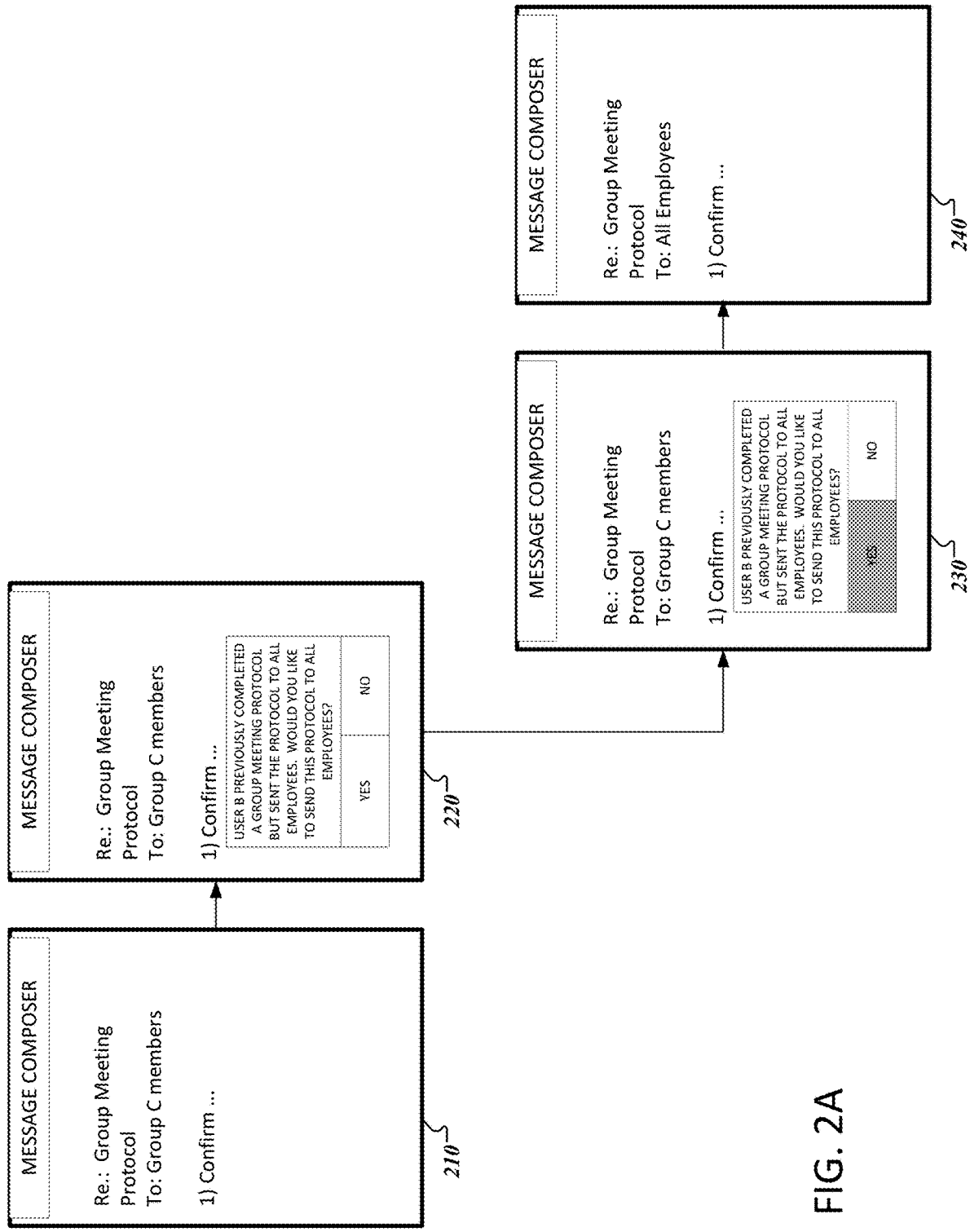
FIG. 2A depicts an example of a scenario of providing recommendations based on one or more user interactions.
Figure 2B:
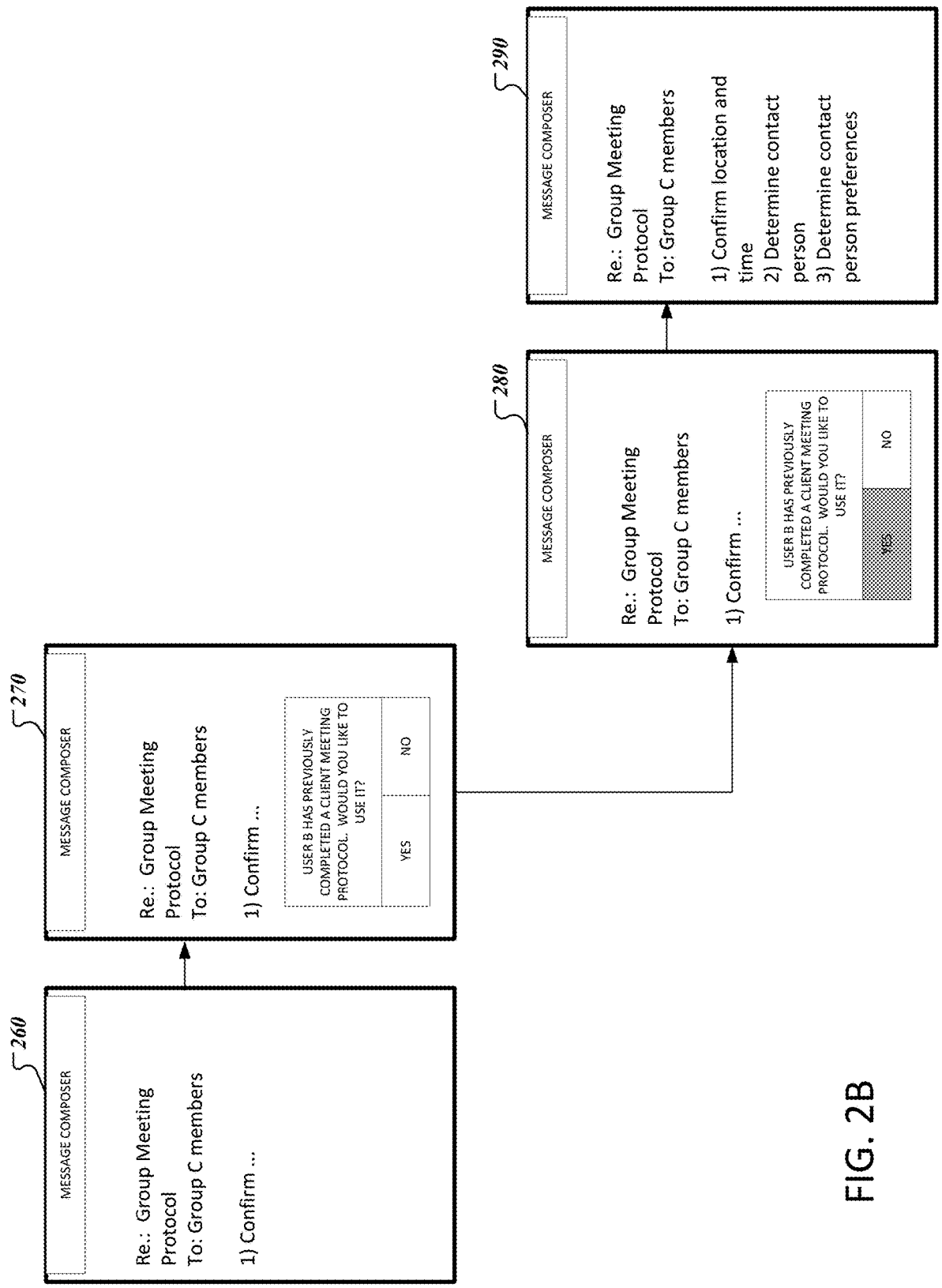
FIG. 2B depicts an example of a scenario of providing recommendations based on one or more user interactions.

FIGS. 2A and 2B depict examples of scenarios of providing recommendations based on one or more user interactions. In FIG. 2A, a user, user A, may be operating a device to compose a message related to meeting protocols for a group the user is a member of. Although a message composition example is illustrated in FIGS. 2A and 2B, it should be understood that the user may be drafting various suitable types of documents or reports. User A's device is connected to a system, such as an enterprise system or a secure wireless network, which may monitor the interactions of all users on the system.

The system monitors user A's interaction with the system and determines that user A is attempting to compose a message related to a meeting protocol for members of Group C (210, 260). The system may then search telemetric data to determine correlations, such as operational trends and users associated with group meeting protocol messages. For example, the system may determine that similar messages have generally been sent to all employees and that a user B, who is also a member of Group C, has previously written a meeting protocol memo. The system may then generate recommendations 1) to modify the destination of the message to include all employees, and 2) to include content in the message previously drafted by user B in the body of the message being drafted by user A.

The system performs a confidence check to determine if the recommendations satisfy a confidence level threshold. To perform the confidence check, the system may rely on additional information such as a history of recommendations sent to user A, settings or filters selected by user A, preference information of user A stored in user A's profile, and various other suitable parameters.

For the first scenario illustrated by depictions 210-240 in FIG. 2A, the system may determine that user A does not typically accept recommendations for message content associated with user B. Therefore, the recommendation for including content in a message previously drafted by user B fails the confidence check. In addition, the system may determine that user A generally accepts recommendations that suggest addressing other users in a message. Accordingly, the system generates one recommendation and sends a notification message including the recommendation to user A's device. The notification message may be displayed by user A's device and may notify user A that user B previously drafted a similar group meeting protocol and elected to send the message to all employees (220). The system may, through user A's device, query user A to determine if user A would like to address the message to all employees. If user A enters an input indicating that user A would like to accept the recommendation and address the message to all employees (230), the system modifies the "To" or destination field of the message to include addresses of all the employees in the enterprise without any additional input by user A (240).

In the second scenario illustrated by depictions 260-290 in FIG. 2B, the system may determine that user A generally accepts recommendations associated with user B, but generally rejects recommendations for changing addressee information in messages. Therefore, in the second scenario, the recommendation for including content in the message previously drafted by user B passes the confidence check, but the recommendation for addressing other users in the message fails the confidence check. Accordingly, the system only generates one recommendation and sends a notification message to user A's device.

The notification message may be displayed by user A's device and may notify user A that user B has previously written a similar memo. The system may, through user A's device, query user A to determine if user A would like to use the previously-written memo (270). If user A enters an input indicating that user A would like to use the previously-written memo (280), the system obtains the previously-written memo, determine how much of the previously-written memo has already been written by user A, and provide the remaining portion of the memo to user A (290). In some cases, the system may not compare the memo of user A with a previously-written memo, and may simply provide a copy of the previously-written memo to user A. In some cases, the system may superimpose the previously-written memo on user A's written memo and may highlight, in any suitable manner, differences between the previously-written memo and the memo already written by user A.

Figure 3:
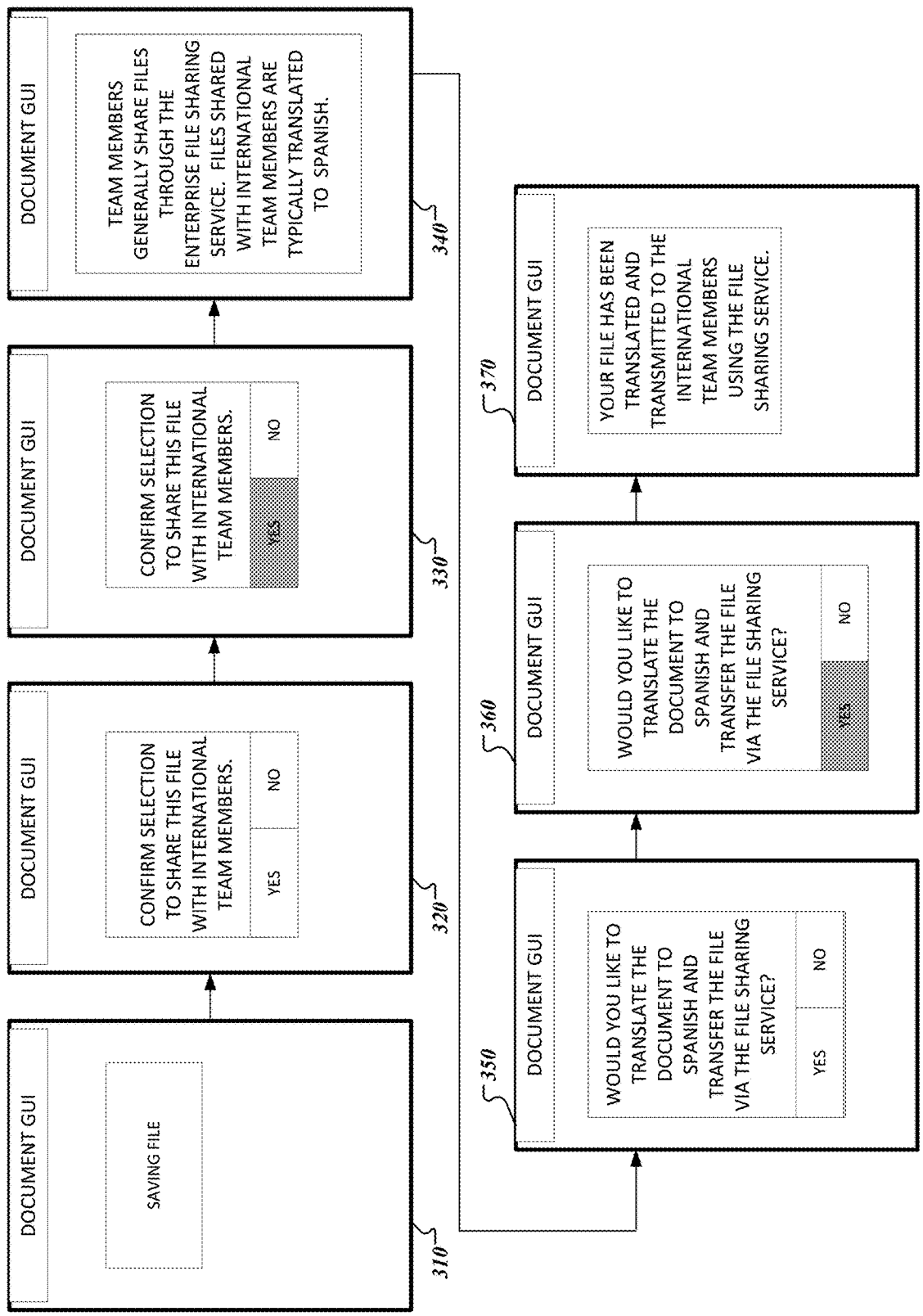
FIG. 3 depicts an example of a scenario of providing recommendations based on a set of operations.

FIG. 3 depicts an example of a scenario of providing recommendations based on a set of operations.

Referring to FIG. 3, a user may have a document open for editing and has provided an input to the user device to save the file associated with the document (310). After saving the file, the user may provide another input indicating that the user would like to share the file with other users. In the illustrated example, the other users are international team members. In some cases, the user may be asked to confirm the user's input indicating that the user would like to share the document with other users (320 and 330).

While the user performs one or more operations, the system monitors interactions of the user with the system, and detects the set of operations executed by the user. For example, in the scenario illustrated in FIG. 3, the system determines that the user has opened a document, edited the document, saved the document, and would like to share the document with international team members. The system may then correlate this set of operations with similar sets of operations previously executed on the system. For example, the system may search telemetric data in the system to determine if other users have executed a similar set of operations (e.g., open, edit, save, share).

In some cases, the system may not find any correlation with the set of operations and will let the user proceed with additional operations. In some cases, the system may detect a correlation with one or more similar sets of operations, and may determine subsequent operations executed in the similar sets of operations. For example, the system may determine that another user also previously opened, edited, saved, and shared a file with international team members using an enterprise file sharing service. After sharing the file, this other user opted to print the file. The system may also determine that a third user opted to email the file after sharing a file with international team members. The system may thus determine subsequent operations executed in the similar sets of operations and filter, using the confidence test, one or more of the identified next operations for recommending to the user. The selection may be based on a number of factors such as, for example, a frequency count of how many times a particular operation was executed after the user's set of operations was executed.

In the illustrated scenario depicted in FIG. 3, the system determines that previous users have generally preferred sharing files with international team members using an internal or enterprise file sharing service or email. Additionally, the system determines that files transmitted to international team members are frequently translated to Spanish because the international team members' operative language is Spanish.

The system performs a confidence test to determine which subsequent operation may be most relevant for the user. As a result of performing the confidence test, the system discards the recommendation for transmitting the file via email, and transmits a notification to the user device with a recommendation for sharing files through an enterprise file sharing system and a recommendation for translating the file to Spanish (340, 350).

If the user agrees with the recommendation (360), the system will automatically translate the file to Spanish and share the translated file with the international team members (370). If the user does not agree with the recommendation, the user may proceed with any operation.

In some cases, the user may not be aware that files are generally translated before sending the files to members of the international team. In some cases, a user may be aware of the translation operation but may forget to perform the translation before transmitting the file. Accordingly, due to the intelligent recommendations provided by the system, the user can benefit from the recommendation, timely translation, and preferred method of transmitting documents to members of the international team. Absent the recommendation, the user may have had to inconveniently request translation at a later point in time and resend the translated file, resulting in overall inefficiency of the user's time and network resources.

In some implementations, the system may not provide the identity of the person who has previously executed an operation or drafted a document and may provide a recommendation anonymously without specifying an identity of the user. In some implementations, a recommendation is provided with an identity of the person who previously executed an operation or drafted a document being recommended. Inclusion of a person's identity in the recommendation may give credibility to the recommendation, particularly, if the person identified in the recommendation is connected to the user receiving the recommendation. In some implementations, a user may configure the settings of the system to only provide recommendations associated with trusted sources such as, for example, users who may be colleagues of the user, members of a group of which the user is also a member of, friends connected to the user through a social network, or particular resources on the Internet or databases that the user trusts.

User elections or rejections of recommendations, as discussed with reference to FIGS. 2A, 2B, and 3, may be used by the system to train a recommendation engine in the system and to create a user profile that stores preferences of a user and a history of user interactions with the system.

As noted above, the system continuously monitors all activity and interactions in the system's networks. For example, in an enterprise environment, the system may continuously monitor interactions and operations being performed by enterprise members using the system. The monitored data may be stored as telemetric data in various suitable formats including, for example, using a log format to log details related to interactions and operations performed in the system. Log details may include, but are not limited to, for example, a time of the interaction, a date of the interaction, one or more users triggering the interaction, a physical location of the interaction, a cyber location of the interaction, an operation associated with the interaction, an object involved in the interaction, a description or context of the interaction type, and metadata associated with the interaction. Log details may be utilized to facilitate provision of intelligent recommendations, as described in further detail with reference to FIGS. 4 and 5. In some implementations, the methods may be executed in a system illustrated and described with reference to FIG. 6.

Figure 4:
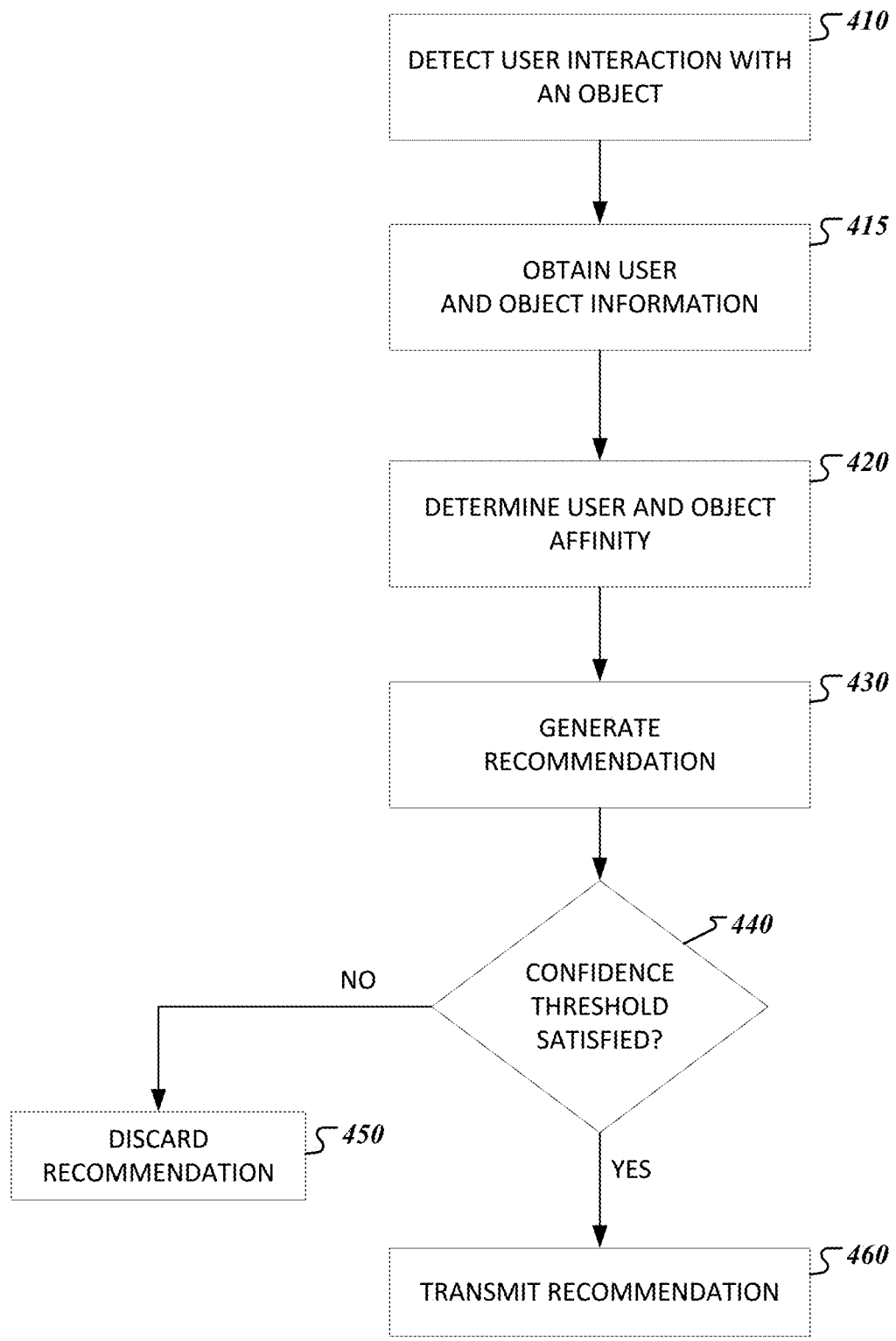
FIG. 4 depicts a flowchart of an example of a method to provide recommendations based on one or more user interactions.

FIG. 4 depicts a flowchart of an example of a method to provide recommendations based on one or more user interactions. The system may detect a user interaction with an object (410). An object may refer to any application, file, folder, report, document, dossier, image, textual string, or element within an application, file, folder, report, document, or dossier in the system. An interaction may include various suitable interfaces, operations, or contacts between a user and the system. For example, an interaction may include a user editing a document, a user performing a search on the Web, a user uploading a file to the system, or a user conducting a conference call or a presentation. A dossier may refer to an interactive document that is sharable and editable by one or more people. In some implementation, the dossier may contain a structure of multiple objects other than a dossier, such as multiple documents or images that can be edited by multiple people.

The system may then obtain information about the user and object involved in the detected interaction to determine object and user characteristics (415). For example, the system may obtain an identification of the user involved with the interaction. The system may obtain the user identification using various suitable methods including, for example, by checking log and user details of the user or a device (e.g., computer) involved in the interaction. The system may also determine characteristics associated with the user. For example, the system may determine a job title of the user, job responsibilities of the user, and groups of which the user is a member of. In some implementations, the user may have a profile with stored user preferences, user settings, and a history of user interactions with the system. The system may refer to the user profile to determine characteristics associated with the user.

The system may also obtain object information such as, for example, a type of object, one or more files or applications associated with the object, users currently or previously interacting with the object, a date the object was created, one or more times the object was modified, and a purpose or function associated with the object. For example, if the object is a document, the system may obtain information about the users who have currently or previously viewed, edited, or created the document; time and date information related to the creation, modification or viewing of the document; and a purpose associated with the document such as, for example, "procedures for operating sensitive equipment."

After obtaining user and object information, the system may determine a user affinity, object affinity, or both the user affinity and object affinity (420). For example, the system may search records, databases, and objects in the system to determine if there are other users similar to the user involved in the interaction and if there are other objects similar to the object involved in the interaction.

In general, various suitable criteria may be used to determine the similarity between users and between objects. For instance, to determine user affinity, the system may search for users having one or more of: the same job title or job description as the user involved in the interaction, or the same department or group as the user involved in the interaction. In some implementations, user affinity may be determined using a social network. For example, a user affinity of two users who are direct contacts (e.g., friends) may be greater than a user affinity of two users who are separated by one or more degrees of separation (e.g., not friends). In general, in determining user affinity, the system may search for users sharing one or more common characteristics with the user involved in the interaction.

To determine object affinity, the system may, for example, search for objects having one or more of: the same object type as the object involved in the interaction; a date and time of creation within a threshold time period of the date and time of creation of the object involved in the interaction; and the same function or purpose as the object involved in the interaction. In general, the system may search for objects sharing one or more common characteristics with the object involved in the interaction.

The various criteria to determine user affinity may be combined and, in some implementations, assigned different weights to calculate a user affinity aggregate for each user determined to have at least some affinity with the user involved in the interaction. The various criteria to determine object affinity may be combined and, in some implementations, assigned different weights to calculate an object affinity aggregate for each object determined to have at least some affinity with the object involved in the interaction. The object affinity aggregate and user affinity aggregate may be indicators of a degree of similarity of an object or user with the respective object and user involved in the interaction.

Based on the determined one or more of the user and object affinity aggregates, the system may generate recommendations for users and objects that, respectively, have a user affinity aggregate and object affinity aggregate greater than a user affinity threshold and an object affinity threshold (430).

For example, if the user is a JAVA programmer and is programming code for a particular application, the system may generate recommendations for content related to code that is generated by other JAVA programmers who have programmed the same or similar application. In some cases, the system may not generate a recommendation for other documents that are generated from a JAVA programmer but are unrelated to the programming code for the particular application. In some cases, the system may not generate a recommendation for programming code for the particular application that is not written by JAVA programmers.

As another example, a user may input a search query using a search interface and may have applied a number of filter settings to narrow or optimize search results. Upon detecting input of the search query, the system may generate a recommendation for applying different filter settings used previously by users having a similar profile as the searching user and who were searching for the same or similar search query as the query being searched for by the user. In some cases, the system may not generate a recommendation for applying additional filter settings used previously by users who do not have a similar profile as the searching user but who were searching for the same or similar search query as the query being searched for by the user. In some cases, the system may not generate a recommendation for applying additional filter settings used previously by users have a similar profile as the searching user but who were searching for a search query different than the query being searched for by the user.

The generated recommendation is analyzed to determine a confidence level of the recommendation for the user, and the determined confidence level is compared to a confidence threshold (440). The confidence level of a recommendation may be determined by various factors including, for example, user interaction relevance, user profile, and a quality indicator. The various factors may be combined and, in some implementations, assigned different weights to calculate a confidence level of the generated recommendation.

A quality indicator indicates the likely quality of a recommendation. For example, if the recommendation is for a particular code, and the code has generated numerous errors, does not compile properly, or has a long execution time, the quality level associated with the code may be low. Thus, the quality indicator for a recommendation of such a code may be low. In general, the system may determine the quality of an object being recommended and generate a quality score reflecting the determined quality. Factors determining the quality of an object may vary based on the type of object.

User profile may be used in various manners for determining the confidence level. For instance, in some cases, the system may query a user history in the user profile to determine the frequency of similar recommendations being made to the user. In some cases, the system may determine the response of the user to similar recommendations in the past. If the user has rejected similar recommendations more than a threshold number of times, the system may allocate a low confidence level to the generated recommendation. If the user has accepted similar recommendations more than a threshold number of times, the system may allocate a high confidence level to the generated recommendation. The threshold number of times may be set by a system administrator or the user. The similarity of recommendations may be determined using an object affinity and user affinity as described, and any other feature of the recommendations.

The user profile may also be used to determine user preferences, and to determine if the generated recommendation correlates with user preferences. In particular, the system may compare features of a generated recommendation with features of user preferences to determine a confidence level for the generated recommendation. As an example, the system may determine that a user has a preference of sending files through a file sharing system rather than through email. Accordingly, in some cases, if the system generates a recommendation for sharing a file through email, the system will assign a low confidence level to the generated recommendation based on the user preferences. In some cases, if the system generates a recommendation for sharing a file through a file sharing system, the system will assign a high confidence level to the generated recommendation based on the user preferences.

As another example, the system may determine that a user has a history of accepting recommendations derived from users within a particular department of a corporation. Accordingly, in some cases, if the system generates a recommendation for adding content generated by a user from outside the particular department, the system will assign a low confidence level to the generated recommendation based on the user preferences. If the system generates a recommendation for adding content generated by a user from the particular department, the system will assign a high confidence level to the generated recommendation based on the user preferences.

User interaction relevance may also be used to determine a confidence level associated with a recommendation. User interaction relevance may refer to the relevance of one or more user interactions to a particular recommendation. The user interaction could be any type of interaction of the user with an object in the system. For example, if a user spends a significant amount of time drafting a particular portion of a document related to a specific subject matter, a recommendation for content related to another portion of the document or subject matter other than the specific subject matter may not be designated a high confidence level. A recommendation for content related to the specific subject matter in the particular portion may be assigned a high confidence level.

As can be appreciated from the foregoing example, the system may monitor not just the interactions, but also the nature of the interactions, for example, the subject matter involved in the interaction, a portion of an object involved in the interaction, and any other suitable data that may help characterize the interaction. Information regarding the interactions may be stored as telemetric data in any suitable manner, including, for example, in a log or database format.

User interaction relevance may also help account for dynamic, real-time changes in user interests, preferences, and interactions, and may thus provide a useful tool in determining the likely interest of a user in a particular recommendation.

The confidence level for a generated recommendation may be determined in various suitable formats. In the examples described above, the confidence level was binary—low or high. However, in some implementations, the confidence level may be non-binary and may be implemented using, for example, a scale, e.g., 1 to 10. The confidence threshold may then be set to a particular number, for example, 6 or 7, by a system administrator or user, and the confidence level determined for a generated recommendation must be equal to or greater than the confidence threshold to satisfy the confidence threshold.

If the confidence level determined for a generated recommendation satisfies the confidence threshold, the generated recommendation may be transmitted to the user device (450). If the confidence level determined for a generated recommendation does not satisfy the confidence threshold, the generated recommendation may be discarded (460). Discarding recommendations that do not satisfy the confidence level is useful in preventing recommendations that may not be relevant, valued, or likely to be accepted by the user from being transmitted to a user device.

When the recommendation is received by the user device, the user device may output the recommendation in a colloquial language format so that the user of the user device can easily understand the recommendation. The recommendation may be output in various suitable manner, including, for example, displaying alphanumeric text corresponding to the recommendation on a display of the user device, and emitting an audio signal corresponding to the recommendation through a speaker of the user device.

The user may respond by accepting the recommendation or rejecting the recommendation. A message indicating the acceptance or rejection of the recommendation may then be transmitted from the user device to the system, which may store an indication of the user's response in a user history database or user profile stored in the system.

Figure 5:
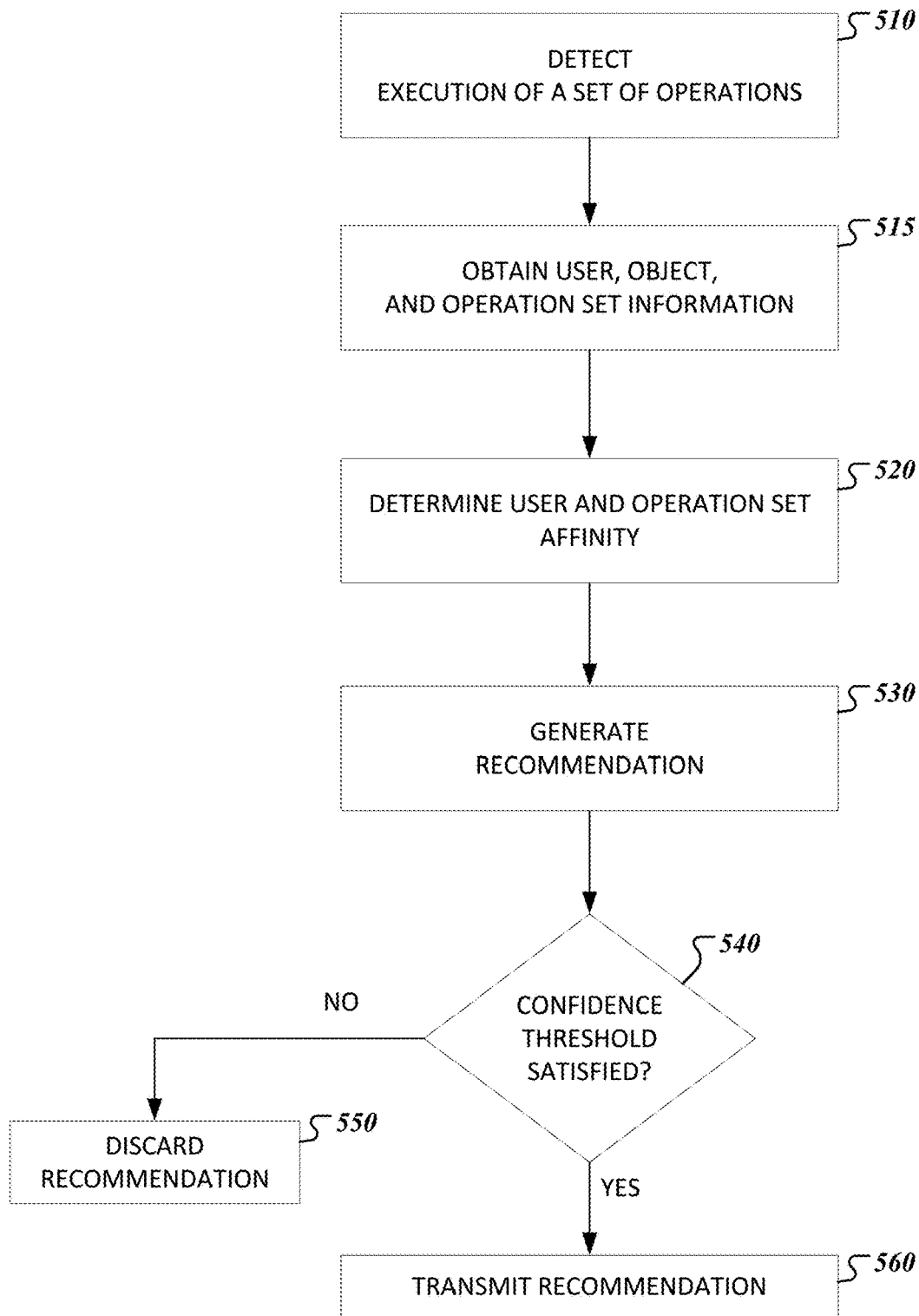
FIG. 5 depicts a flowchart of an example of a method to provide recommendations based on a set of operations.

FIG. 5 depicts a flowchart of an example of a method to provide recommendations based on a set of operations. In the illustrated method of FIG. 5, the system monitors user interaction with the system and detects execution of a set of operations in the system (510). The set of operations may be executed with or without direct input from a user, and, in some cases, may be a set of operations running in the background of a particular application in the system in response to a user interaction.

The system may then obtain information about the set of operations (interchangeably referred to as "operation set")

and the user and object involved in the operation set to determine object, user, and operation set characteristics (515).

A description of how the system may obtain user and object information is provided above with reference to operation 415 in FIG. 4. Information about the operation set may include various data points including, but not limited to, for example, an application for which the operation set is being executed for, a date or time during which the operation set is being executed, a purpose or objective of executing the operation set, users and objects involved in the operation set, a sequence of the operations in the operation set, and a physical or cyber location associated with the operation set.

After obtaining user, object, and operation set information, the system may determine one or more of the user affinity, object affinity, and operation set affinity (520).

A description of how the system determines user and object affinities is provided above with reference to operation 420 in FIG. 4. Operation set affinity may be obtained by determining a similarity level between another set of operations previously executed in the system and the operation set being executed in the user device. In general, the system may search for operation sets sharing one or more common characteristics with the detected operation set, and may use various suitable criteria to determine the similarity between operation sets. For instance, to determine similarity between operation sets, the system may compare one or more of: the sequence of operations in the respective operation sets; the number and type of operations in the respective operation sets; the users and objects involved in respective operation sets, the purpose or objective of executing the operation sets; operations preceding or following the respective operation sets; and a location associated with the respective operations sets.

The system may combine the output of the various comparison outcomes, and, in some implementations, assign different weights to the outcomes to calculate an operation set affinity aggregate for each operation set determined to have at least one or more common characteristics with the detected operation set. In some implementations, the operation set affinity aggregate may indicate a degree of similarity between two operation sets including the detected operation set.

Based on the determined one or more of the user affinity aggregate, object affinity aggregate, and operation set aggregate, the system may generate recommendations for operation sets that have a user affinity aggregate, object affinity aggregate, and operation set aggregate greater than a user affinity threshold, an object affinity threshold, and an operation set affinity threshold, respectively (530).

For example, referring to FIG. 3, the system may also determine that in previously-executed operation sets involving the opening, editing, saving, and sharing of a file, users may also print the file or select a portion of the file to send to a supervisor. The users who print the file have a similar job description as the user for which the operation set was detected. Users who select a portion of the file to send to a supervisor generally have an occupational position that is junior to or not the same as an occupational position of the user for whom the operation set was detected. Accordingly, a user affinity and operation set affinity associated with a set of operations that include opening, editing, saving, sharing, and then printing a file may be greater than the user affinity threshold and operation set affinity threshold, respectively, whereas a user affinity and operation set affinity associated with a set of operations that include opening, editing, saving, sharing, and then selecting a portion of the file may be less than the user affinity threshold and operation set affinity threshold, respectively. The system may then generate a recommendation for printing the file to the user, but may not generate a recommendation for selecting a portion of the file to send to the user's supervisor.

As another example, the system may determine that in previously-executed operation sets involving the opening, editing, saving, and sharing of a file, users may also print the file or close the file. However, the order of operations may be different for users who also print the file. For example, users who print the file may share the file before saving the file, whereas users who close the file, generally save the file, share the file, and then close the file. Accordingly, due in part to the sequence of operations, an operation set affinity associated with a set of operations that include closing the file may be greater than the operation set affinity threshold, and an operation set affinity associated with a set of operations that include printing the file may be less than the operation set affinity threshold. The system may then generate a recommendation for closing the file, but may not generate a recommendation for printing the file.

The generated recommendation is then analyzed to determine a confidence level of the recommendation for the user, and the determined confidence level is compared to a confidence threshold (540). The confidence level of a recommendation may be determined and compared, as described above with reference to operation 440 in FIG. 4.

If the confidence level determined for a generated recommendation satisfies the confidence threshold, the generated recommendation may be transmitted to the user device (550). If the confidence level determined for a generated recommendation does not satisfy the confidence threshold, the generated recommendation may be discarded (560).

When the recommendation is received by the user device, the user device may output the recommendation in a colloquial language format so that the user of the user device may be able to easily understand the recommendation. The recommendation may be output in various suitable manner, including, for example, displaying alphanumeric text corresponding to the recommendation on a display of the user device, and emitting an audio signal corresponding to the recommendation through a speaker of the user device.

The user may respond by accepting the recommendation or rejecting the recommendation. A message indicating the acceptance or rejection of the recommendation may then be transmitted from the user device to the system, which may store an indication of the user's response in a user history database or user profile stored in the system.

In some implementations, user responses to recommendations may be used to train a recommendation engine in the system in various manners. For example, user responses to recommendations may help train the system to: determine when users are likely to accept or reject a particular recommendation; identify particular contexts or environments in which particular recommendations may be applicable; modify weights assigned to particular factors considered for determining confidence levels; modify weights assigned to particular factors considered for generating recommendations; and modify, add, or remove one or more factors used to determine confidence levels or generate recommendations;

In addition, in some implementations, the system may generate recommendations according to one or more rules. The one or more rules may specify, for example, when a recommendation can or cannot be provided to a user, and providing intelligent recommendations upon the satisfaction of certain conditions and requirements. For example, to prevent the user from being inundated with recommendations, the system may impose limits on the recommendation engine preventing the recommendation engine from generating recommendations in certain circumstances, such as, for example, when the user may be typing or watching a video. The rules may limit the number of recommendations that can be provided to a user in a period of time, for example, a limit of one recommendation in a five minute period of time. As another example, the system may have a rule that triggers the recommendation engine to provide a recommendation in certain circumstances, for example, when a user opens or closes a document or object, or based on the type of object involved in the interaction or operation set. It should be understood that various suitable rules may be applied, and that the rules may be set by a system administrator. In some implementations, the rules may not be modified. In some implementations, the system training may include modifying the one or more rules according to user responses to recommendations.

In some implementations, the factors considered for generating a recommendation and for determining a confidence level of a generated recommendation may be combined such that only interactions or operation sets having satisfied the object affinity threshold, user affinity threshold, operation set affinity threshold, and the confidence threshold are generated. Accordingly, in some implementations, operations 430 and 440 may be combined and executed as part of the same operation. In some implementations, operations 530 and 540 may be combined and executed as part of the same operation.

Figure 6:
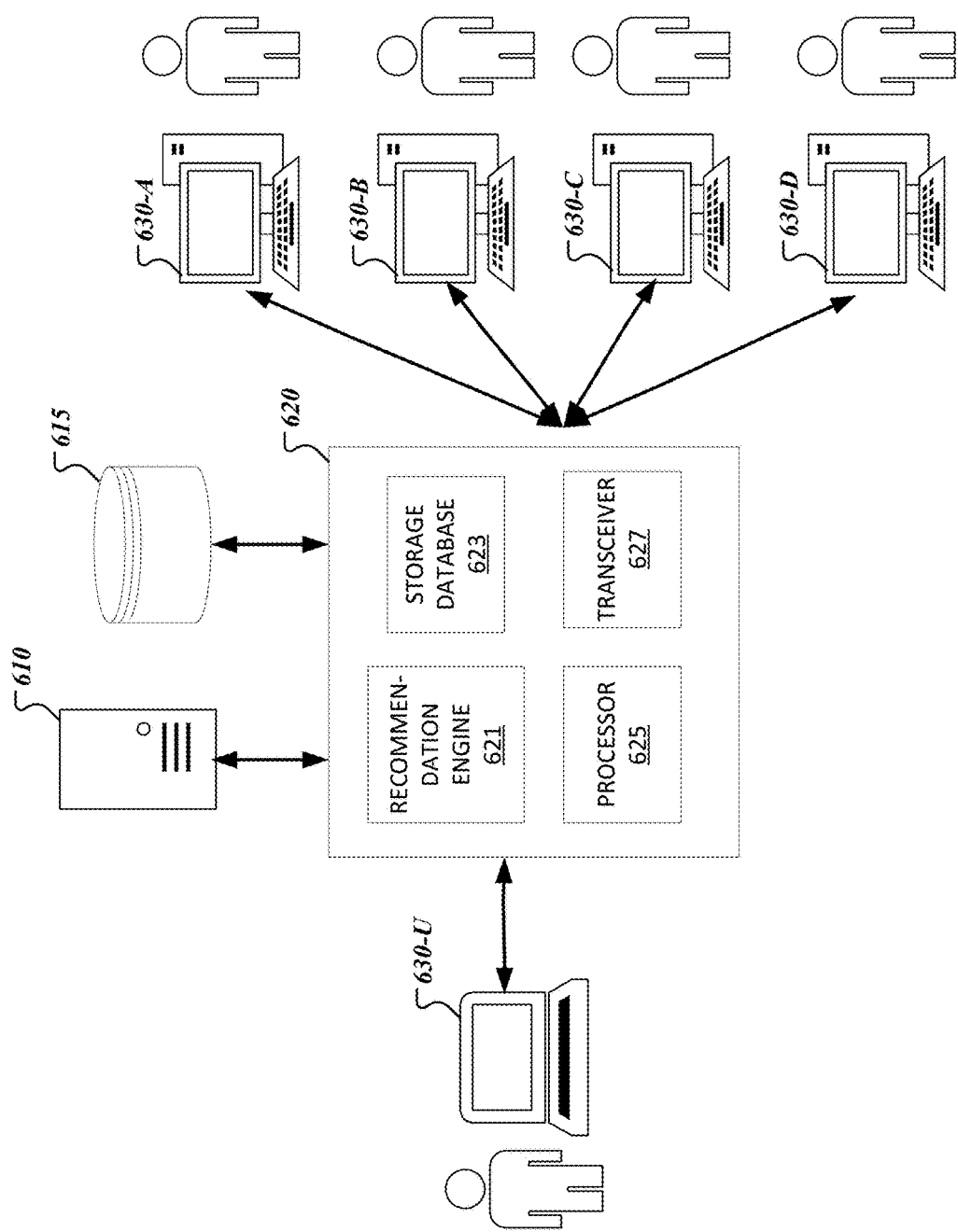
FIG. 6 depicts an example of a system for providing recommendations to users.

FIG. 6 depicts an example of a system for providing recommendations to users. The system 620 may include a recommendation engine 621, a storage database 623, a processor 625, and a transceiver 627. The system 620 may be implemented in one or more networks and may be connected to one or more network servers 610 and one or more databases 615. In addition, the system 620 may be connected to multiple user devices 630-A, 630-B, 630-C, 630-D, and 630-U through the one or more networks.

The one or more networks may provide network access, data transport, and other services to the system 620, one or more network servers 610, one or more databases 615, and user devices 630-A, 630-B, 630-C, 630-D, and 630-U. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, corporate network, or any combination thereof.

In some implementations, the one or more networks may include a cloud system, one or more storage systems, and the one or more servers described above. The one or more networks including the cloud system may provide Internet connectivity and other network-related functions.

The one or more networks may include the one or more servers 610, the one or more databases 615, access points, storage systems, cloud systems, access points, and modules. The one or more servers 610 may include any suitable computing device coupled to the one or more networks, including but not limited to a personal computer, a server computer, a series of server computers, a mini computer, and a mainframe computer, or combinations thereof.

The one or more servers 610 may communicate with system 620 to implement one or more operations of the intelligent recommendation methods described herein, but are not limited thereto. For example, the one or more servers 610 may include a web server (or a series of servers) running a network operating system, examples of which may include but are not limited to Microsoft® Windows® Server, Novell® NetWare®, or Linux®. The one or more servers 610 may also implement common and standard protocols and libraries, such as the Secure Sockets Layer (SSL) protected file transfer protocol, the Secure Shell File Transfer Protocol (SFTP)-based key management, and the NaCl encryption library. The one or more servers 610 may be used for and/or provide cloud and/or network computing. Although not shown in the figures, the one or more servers 610 may have connections to external systems providing messaging functionality such as e-mail, SMS messaging, text messaging, and other functionalities, such as encryption/decryption services, cyber alerts, etc.

The one or more servers 610 may be connected to or may be integrated with one or more databases 615. The one or more databases 615 may include a cloud database or a database managed by a database management system (DBMS). In general, a cloud database may operate on platforms such as Python. A DBMS may be implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle® database, IBM® DB2, Adaptive Server Enterprise, FileMaker®, Microsoft® Access®, Microsoft® Structured Query Language (SQL) Server, MySQL™, PostgreSQL®, MongoDB, Mondo/ES JavaScript Object Notification (JSON), and a NoSQL implementation. A DBMS typically includes a modeling language, data structure, database query language, and transaction mechanism. The modeling language may be used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Each of the user devices 630-A, 630-B, 630-C, 630-D, and 630-U may be any suitable electronic device, mobile and immobile, that is utilized by a user to interact with system 620 and the one or more networks. Examples of the user devices 630-A, 630-B, 630-C, 630-D, and 630-U include, but are not limited to, a computer, lap top, desktop, personal digital assistant, electronic pad, electronic notebook, mobile phone (e.g., smart phone), smart television, smart watch, smart glasses, network appliance, camera, enhanced general packet radio service (EGPRS) mobile phone, media player, navigation device, email device, and game console. In general, each of the user devices 630-A, 630-B, 630-C, 630-D, and 630-U may be any electronic device that is connected to a network and has an input unit and an output unit, such as a display. In some implementations, user devices 630-A, 630-B, 630-C, 630-D, and 630-U may be wirelessly connected to the one or more networks through an access point. In some implementations, user devices 630-A, 630-B, 630-C, 630-D, and 630-U may be connected to the one or more servers 610 through a proxy server.

Each of the user devices 630-A, 630-B, 630-C, 630-D, and 630-U may communicate with system 620, the one or more servers 610, the one or more databases 615, or each other through one or more networks. For example, the user devices 630-A, 630-B, 630-C, 630-D, and 630-U may receive recommendations from the system 620, and may transmit responses to the recommendations to the system 620. In some implementations, two or more of the user devices 630-A, 630-B, 630-C, 630-D, and 630-U may be associated with users that are part of a particular group or department within an enterprise or corporation.

The recommendation engine 621 in system 620 is configured to generate recommendations for users associated with user devices 630-A, 630-B, 630-C, 630-D, and 630-U by executing some or all of the operations in the implementations described above. The recommendation engine 621 may communicate with one or more of the components (e.g., storage database 623, processor 625, and transceiver 627) of the system 620 to generate recommendations. For example, the recommendation engine 621 may query the storage database 623 to access one or more rules for generating recommendations or to obtain user profile information or telemetry data. The recommendation engine 621 may send recommendations to user devices 630-A, 630-B, 630-C, 630-D, and 630-U through transceiver 627 and receive responses from the user devices 630-A, 630-B, 630-C, 630-D, and 630-U through the transceiver 627. In some implementations, the recommendation engine 621 may include one or more neural networks. The neural networks may be trained based on user feedback and responses, as described above.

In general, the recommendation engine 621 may be implemented using any suitable combination of hardware and software. In some implementations, the recommendation engine 621 may be implemented as part of the processor 625. The processor 625 may control all operations of system 620, functions executed by the system 620, and communications within system 620, and external communications to and from system 620. The processor 625 may include various logic circuitry and programs to execute the various implementations described herein.

Transceiver 627 includes a transmitter and a receiver and may be utilized to communicate with the one or more network servers 610, the one or more databases 615, and user devices 630-A, 630-B, 630-C, 630-D, and 630-U. The transceiver 627 may include amplifiers, modulators, demodulators, antennas, and various other components. The transceiver 627 may direct data received from other devices to other components of the system 620 such as the recommendation engine 621, processor 625, and storage database 623. The transceiver 627 may also direct data received from components of system 620 to other devices in in the one or more networks.

Storage database 623 may include one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some implementations, the storage unit 623 may store one or more of telemetric data, user profiles, user history, and rules for generating recommendations. Storage of data may be distributed such that some data is stored in storage database 623, whereas other data is stored in the one or more databases 615. The storage and handling of data satisfies any privacy or security requirements of the system 620, users, or enterprise network which the system 620 communicates with.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, for example, one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. A processor may include any suitable combination of hardware and software.

Elements of a computer may include a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer may not have such devices. Moreover, a computer may be embedded in another device, for example, a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
   detecting, by one or more computing devices, one or more interactions of a user with an object in a computing environment that includes a network;
   accessing, by the one or more computing devices, activity data for the user and one or more other users, the activity data indicating interactions of users with objects in the computing environment;
   based on the activity data, determining, by the one or more computing devices, a level of similarity between interactions of the user with the objects in the computing environment and interactions of the one or more other users with the objects in the computing environment;
   generating, by the one or more computing devices, a recommendation based on the determined level of similarity, the recommendation comprising a suggestion to include, in the object interacted with by the user, content included in an object in the computing environment that the one or more other users interacted with;
   determining, by the one or more computing devices, a confidence level for the recommendation based on one or more responses to prior recommendations provided by the one or more computers;
   determining, by the one or more computing devices, that the confidence level for the recommendation satisfies a confidence threshold; and
   based on determining that the confidence level for the recommendation satisfies the confidence threshold, transmitting the recommendation to a user device associated with the user.

2. The computer-implemented method of claim 1, wherein determining, by the one or more computing devices, that the confidence level for the recommendation satisfies the confidence threshold comprises:
   determining a quality level of an object being recommended in the recommendation; and
   determining that the quality level satisfies a quality threshold.

3. The computer-implemented method of claim 1, further comprising:
   storing data indicative of an acceptance or a rejection of a previous recommendation transmitted to the user device, the previous recommendation being transmitted prior to the recommendation being generated, and
   wherein determining, by the one or more computing devices, the confidence level for the recommendation comprises determining the confidence level based on the data indicative of an acceptance or a rejection of the previous recommendation transmitted to the user device.

4. The computer-implemented method of claim 1, further comprising:
   storing, as at least a portion of the activity data, a history of interactions associated with the user,
   wherein determining, by the one or more computing devices, the confidence level for the recommendation comprises determining the confidence level based on the history of interactions associated with the user.

5. The computer-implemented method of claim 1, wherein the object is selected from the group consisting of an application, file, folder, report, document, dossier, image, textual string, and an element within an application, file, folder, report, document, or dossier.

6. The computer-implemented method of claim 1, wherein determining the level of similarity comprises determining a level of similarity between the object the user interacted with and one or more other objects based on a similarity between an attribute of the object and an attribute of the one or more other objects accessible over the network.

7. The computer-implemented method of claim 6, wherein the attribute of the object is at least one of an object type for the object, a date and time of creation of the object, metadata associated with the object, or content of the object.

8. The computer-implemented method of claim 1, wherein generating the recommendation comprises generating the recommendation in response to determining that the object is being created or is being modified.

9. The computer-implemented method of claim 1, wherein the objects in the computing environment and the one or more other users having devices connected to the network are identified using telemetric data that is indicative of interactions between the objects in the computing environment and one or more other users having devices connected to the network.

10. The computer-implemented method of claim 1, further comprising:
receiving, from the user device associated with the user, a response indicating whether the user accepted or rejected the recommendation; and
storing, in a user profile located in a storage database, data indicating whether the user accepted or rejected the recommendation.

11. The computer-implemented method of claim 1, wherein accessing the activity data comprises accessing activity data indicating interactions performed by users in response to previous recommendations.

12. A system comprising:
one or more computers; and one or more computer-readable media storing instructions that, when executed by the one or more computers, cause the one or more computers to perform operations comprising:
detecting, by the one or more computers, one or more interactions of a user with an object in a computing environment that includes a network;
accessing, by the one or more computers, activity data for the user and one or more other users, the activity data indicating interactions of users with objects in the computing environment;
based on the activity data, determining, by the one or more computers, a level of similarity between interactions of the user with the objects in the computing environment and interactions of the one or more other users with the objects in the computing environment;
generating, by the one or more computers, a recommendation based on the determined level of similarity, the recommendation comprising a suggestion to include, in the object interacted with by the user, content included in an object in the computing environment that the one or more other users interacted with;
determining, by the one or more computers, a confidence level for the recommendation based on one or more responses to prior recommendations provided by the one or more computers;
determining, by the one or more computers, that the confidence level for the recommendation satisfies a confidence threshold; and
based on determining that the confidence level for the recommendation satisfies the confidence threshold, transmitting the recommendation to a user device associated with the user.

13. The system of claim 12, wherein determining, by the one or more computers, that the confidence level for the recommendation satisfies the confidence threshold comprises:
determining a quality level of an object being recommended in the recommendation; and
determining that the quality level satisfies a quality threshold.

14. The system of claim 12, comprising:
storing data indicative of an acceptance or a rejection of a previous recommendation transmitted to the user device, the previous recommendation being transmitted prior to the recommendation being generated, and
wherein determining, by the one or more computers, the confidence level for the recommendation comprises determining the confidence level based on the data indicative of an acceptance or a rejection of the previous recommendation transmitted to the user device.

15. The system of claim 12, comprising:
storing, as at least a portion of the activity data, a history of interactions associated with the user,
wherein determining, by the one or more computers, the confidence level for the recommendation comprises determining the confidence level based on the history of interactions associated with the user.

16. The system of claim 12, wherein the object is selected from the group consisting of an application, file, folder, report, document, dossier, image, textual string, and an element within an application, file, folder, report, document, or dossier.

17. The system of claim 12, wherein determining the level of similarity comprises determining a level of similarity between the object the user interacted with and one or more other objects based on a similarity between an attribute of the object and an attribute of the one or more other objects accessible over the network.

18. The system of claim 17, wherein the attribute of the object is at least one of an object type for the object, a date and time of creation of the object, metadata associated with the object, or content of the object.

19. The system of claim 12, wherein generating the recommendation comprises generating the recommendation in response to determining that the object is being created or is being modified.

20. One or more non-transitory computer-readable media storing instructions that, when executed by one or more computers, cause the one or more computers to perform operations comprising:
detecting, by the one or more computers, one or more interactions of a user with an object in a computing environment that includes a network;
accessing, by the one or more computers, activity data for the user and one or more other users, the activity data indicating interactions of users with objects in the computing environment;
based on the activity data, determining, by the one or more computers, a level of similarity between interactions of the user with the objects in the computing environment and interactions of the one or more other users with the objects in the computing environment;
generating, by the one or more computers, a recommendation based on the determined level of similarity, the recommendation comprising a suggestion to include, in the object interacted with by the user, content included in an object in the computing environment that the one or more other users interacted with;
determining, by the one or more computers, a confidence level for the recommendation based on one or more responses to prior recommendations provided by the one or more computers;
determining, by the one or more computers, that the confidence level for the recommendation satisfies a confidence threshold; and based on determining that the confidence level for the recommendation satisfies the confidence threshold, transmitting the recommendation to a user device associated with the user.

* * * * *